(No Model.)

A. R. BLOOMER.
NUT LOCK.

No. 260,931. Patented July 11, 1882.

WITNESSES:
Fred. G. Dieterich,
Charles H. Baker

Anson R. Bloomer,
INVENTOR.
by Louis Bagger & Co.
ATTORNEYS.

UNITED STATES PATENT OFFICE.

ANSON R. BLOOMER, OF YORKVILLE, OHIO.

NUT-LOCK.

SPECIFICATION forming part of Letters Patent No. 260,931, dated July 11, 1882.

Application filed April 15, 1882. (No model.)

*To all whom it may concern:*

Be it known that I, ANSON R. BLOOMER, of Yorkville, in the county of Jefferson and State of Ohio, have invented certain new and useful Improvements in Nut-Locks; and I do hereby declare that the following is a full, clear, and exact description of the invention, which will enable others skilled in the art to which it appertains to make and use the same, reference being had to the accompanying drawings, which form a part of this specification, and in which—

Figure 1:
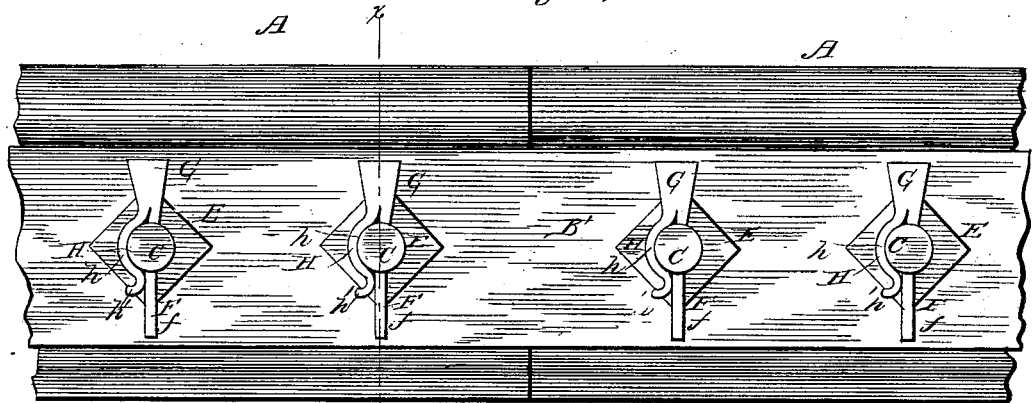
Figure 2:
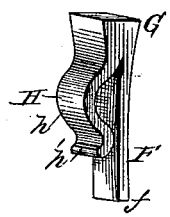
Figure 3:
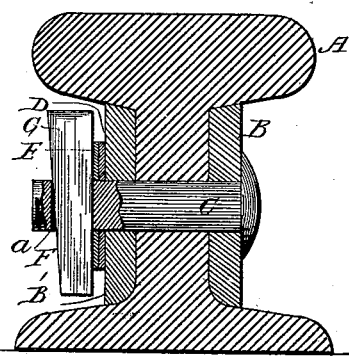
Figure 4:
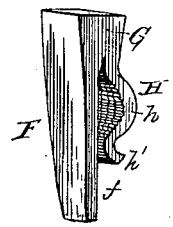

Figure 1 is a side elevation of one of the fish-plates connecting the ends of two railway-rails, showing the application of my improved nut locks or bolt-fasteners. Fig. 2 is a perspective view of one of the locks or fasteners detached. Fig. 3 is a vertical cross-section through the rail, with its fish-plates, on line $xx$ in Fig. 1; and Fig. 4 is a detail view, representing a modified construction of the device.

Similar letters of reference indicate corresponding parts in all the figures.

My invention has relation to devices for fastening the bolts of the fish-plates of railway-rails; and it consists in the detailed construction of a key or fastener which is designed to take the place of the bolt-nuts, as hereinafter more fully described and claimed.

In the accompanying drawings, A A designate the railway-rails, and B B' the fish-plates, which are of the usual construction.

C C are the bolts, which are made of plain cylindrical shape without screw-threads, and have a slot, $a$, near their outer end, the said slotted end projecting through on one side of the rails and fish-plate B', and through a rubber or leather washer, D, and iron washer E.

The keys or bolt-locks consist of three parts— viz., a wedge, F, a solid enlarged head, G, and a clamp or catch, H, which is bent to form a rounded shoulder, $h$. If desired, the rounded part $h$ may be serrated or "set up" with a series of rasp-like teeth or projections on the inner side, as shown in Fig. 4 of the drawings, which will bite the contiguous side of the slotted bolt, and thus assist in holding the key firmly in its place after it has been driven home.

The manner of using this key or fastener will readily be understood by reference to the drawings without further explanation. After the bolts have been inserted, with their slotted ends projecting through the fish-plate B', the washers D and E are slipped over them, and the point $f$ of wedge F is inserted through the bolt-slot $a$ and driven down by hammering on the head G. It will be seen that the lower end of the clamp or part H is bent outwardly, as shown at $h'$, and as this part strikes the bolt it will spring outwardly to one side and enable the wedge to slip down into its slot until it binds firmly against the washer E. The bulge or rounded shoulder between points $h'$ and $h$ having been passed, the "spring" of the metal will cause part H to spring back again into its original position, and thus prevent withdrawal of the key, or if it does not spring far enough back a few blows with a hammer or mallet on the rounded part $h$ will bring this part up against the bolt.

This key cannot come off or work loose on the bolts by the constant jar caused by trains passing on the track. It can be made at less cost than the ordinary nuts, and the elasticity of the washer D, which is interposed between fish-plate B' and the iron washer E, will cause the wedge part F of the key to "draw" the bolt so as to bind the parts firmly together.

Having thus described my invention, I claim and desire to secure by Letters Patent of the United States—

1. The key or bolt-lock herein shown and described, the same consisting of the flat wedge F, head G, and clamp or part H, bent at its lower end into an S shape to form the rounded parts $h$ and $h'$, all made in one piece, substantially as and for the purpose shown and set forth.

2. The combination of the railway-rails A A, fish-plates B and B', bolts C, having slots $a$ at their outer ends, elastic or cushioned washers D, iron washers E, and keys or bolt-locks composed of the parts F, G, and H, constructed and arranged to operate substantially in the manner and for the purpose herein shown and described.

In testimony that I claim the foregoing as my own I have hereunto affixed my signature in presence of two witnesses.

ANSON R. BLOOMER.

Witnesses:
ROBERT SARVIS,
ROBERT A. TILTON.